United States Patent [19]

de Maight

[11] 4,332,303
[45] Jun. 1, 1982

[54] AUXILIARY POWER STEERING

[75] Inventor: Winfried de Maight, Mutlangen, Fed. Rep. of Germany

[73] Assignee: Zahnradfabrik Friedrichshafen, AG, Friedrichshafen, Fed. Rep. of Germany

[21] Appl. No.: 174,932

[22] Filed: Aug. 4, 1980

[51] Int. Cl.³ .............................................. B62D 5/08
[52] U.S. Cl. ....................................... 180/132; 91/446
[58] Field of Search ........................ 180/132; 60/413; 91/446, 447

[56] References Cited

U.S. PATENT DOCUMENTS

| | | | |
|---|---|---|---|
| 3,163,006 | 12/1964 | Nuss et al. | 91/446 X |
| 3,628,424 | 12/1971 | Fruehauf | 91/446 |
| 4,051,766 | 10/1977 | Strauff | 180/132 X |

*Primary Examiner*—John A. Pekar
*Attorney, Agent, or Firm*—Zalkind & Shuster

[57] ABSTRACT

A pressure reducing valve between a high pressure source and a steering control valve lowers the operating pressure of fluid conducted to a piston servomotor from the source by the steering control valve. A constant pressure differential across the steering control valve is maintained by the pressure reducing valve through a feedback pressure balancing arrangement to appropriately vary regulation of the feed pressure to the steering control valve.

9 Claims, 2 Drawing Figures

AUXILIARY POWER STEERING

BACKGROUND OF THE INVENTION

This invention relates generally to auxiliary power steering systems for automotive vehicles.

Auxiliary power steering systems with which the present invention is associated, is of a type having a servomotor pump, a pressure storage reservoir, a steering control valve blocking flow in its neutral position and operable by a hand steering wheel, at least one piston servomotor provided with two pressure operating chambers and a fluid return tank. In such systems, the servo pump and the pressure storage reservoir usually constitute the fluid pressure source from which operating pressures of 140 to 180 BAR are derived. By use of such an auxiliary power steering system, all motor vehicle operational systems including braking, steering, level regulations, etc. may be served by the same pressurized fluid supply. In such case, the pressure storage reservoir is prestressed to maintain a high operating pressure for the systems. Furthermore, a servo pump of small capacity may be selected inasmuch as the reservoir acts as a pressurized fluid collector. In order to serve several fluid operating systems by means of such a common fluid pressure source, it is necessary for the steering control valve of the auxiliary power system to be locked in its neutral, flow blocking position.

A serious problem arises in the foregoing arrangement from the loss of fluid by leakage in view of the high continuous operating pressure prevailing at the valve control edges of the steering control valve. While overlapping of valve surfaces at the control edge portions is desired to obtain a better steering sense from the steering control valve, a high leakage loss occurs in such case. Furthermore, the deposit of solid particles and dirt within the steering control valve impairs tight fitting relationships and thereby increases losses through leakage.

Another disadvantage associated with auxiliary power steering systems of the foregoing type arises from the establishment of variable pressure differentials between the fluid pressure at the inlet of the steering control valve and the pressure prevailing in the operating chambers of the piston servomotor. As a result of the variations in pressure differentials, the steering behavior of the vehicle suffers.

It is therefore an important object of the present invention to provide an auxiliary power steering system wherein fluid flow may be blocked in the neutral position of the steering control valve with minimal leakage and a constant pressure differential maintained between pressures at the inlet and outlet ports of the control valve.

SUMMARY OF THE INVENTION

In accordance with the present invention, a pressure reducing valve is operatively connected between the pressure storage reservoir and the steering control valve in an auxiliary power steering system. The pressure reducing valve is of the pressure balanced type having a spring action on one axial end with the assistance of feedback pressure from the pressurized operating chamber of the servomotor, while regulated pressure conducted to the steering control valve acts on the opposite axial end to balance the spring. By use of such an arrangement wherein the pressure reducing valve is loaded by feedback pressure and a spring, the regulated pressure of the fluid fed to the steering control valve is not only reduced, but its pressure level is preselected by means of the spring force. Furthermore, only a relatively low pressure is thereby exerted on the steering control valve in its neutral position, such as 10 BAR. By virtue of such measures, a very small overlap of valve surfaces at the inlet valve edge portion of the steering control valve may be selected to provide a better steering sense for the driver.

Another advantage resides in the provision of a constant pressure differential between the inlet pressure to the steering control valve and the pressure prevailing in the pressurized operating chamber of the servomotor. As a result, the flow rate of fluid to the operating chambers is predetermined for better proportional control.

The high operating pressure of the pressure storage reservoir is reduced as aforementioned, by the pressure reducing valve to a low operating pressure for the steering control valve. Since the pressure reducing valve may be designed with small dimensions and with overlapping of valve surfaces of any selected magnitude, the losses from leakage in the pressure reducing valve are considerably less than in the steering control valve.

Another benefit of the present invention resides in the utilization of a steering control valve having a neutral position in which fluid flow is not blocked in order to provide a hydraulic reaction to manual turning moments. Such an arrangement is made possible without defeating the objectives of the present invention through design of the pressure reducing valve. In the latter case, it is merely necessary to provide the proper overlap for the valve surfaces at the inlet area for the neutral position of the steering control valve by selection of a proper valve piston.

According to one embodiment of the invention, the pressure reducing valve includes a control valve piston that is floatingly mounted for axial movement and is provided with a valve surface at the valve edge portion cooperating with a housing mounted valve surface to control inflow of fluid, the control valve piston having pressure faces at opposite axial ends. A spring acts on one of the pressure faces to which feedback pressure is also applied from the pressurized operating chamber of the servomotor, balanced by regulated pressure at the outlet of the pressure reducing valve applied to the other pressure face.

In accordance with another embodiment of the invention, the pressure reducing valve is of the type having a piston control element that is engageable with a valve seat and about which an annular valve space is formed. Fluid is conducted from the annular valve space upon unseating of the piston control element through a pressure balancing chamber on the downstream side of the valve seat. The balancing pressure chamber is opposed by a spring chamber housing the spring acting on the piston control element and connected by the feedback pressure line to the pressurized operating chamber of the servomotor.

Another feature of the present invention resides in the provision of a short circuiting check valve prestressed to open in a direction conducting fluid from the pressure supply line for the feedback pressure line for the spring chamber of the pressure reducing valve. The valve spring associated with the check valve has a closing bias somewhat greater than the spring tension of the spring within the pressure reducing valve. In the neutral position of the steering control valve, the high operating pressure of the pressure storage reservoir is momentarily applied to the inlet of the steering control valve. Since this high operating pressure at the inlet of the steering control valve is reduced relatively slowly by the pressure reducing valve, the check valve more rapidly opens to promptly reduce the high operating pressure applied to the steering control valve.

The feedback pressure line aforementioned is advantageously connected to the operating chambers of the servomotor through a switching valve disposed in a transverse connection between the two operating pressure lines from the steering control valve to the operating chambers of the servomotor. Thus operating pressure in one or the other of the operating chambers of the servomotor may be applied through a single feedback pressure line to the pressure reducing valve by use of the switching valve.

DESCRIPTION OF DRAWING FIGURES

Specific embodiments of the invention are hereinafter described in detail with reference to the accompanying drawing, from which additional novel features of the invention will become apparent, and wherein.

DETAILED DESCRIPTION OF PREFERRED EMBODIMENTS

Figure 1:
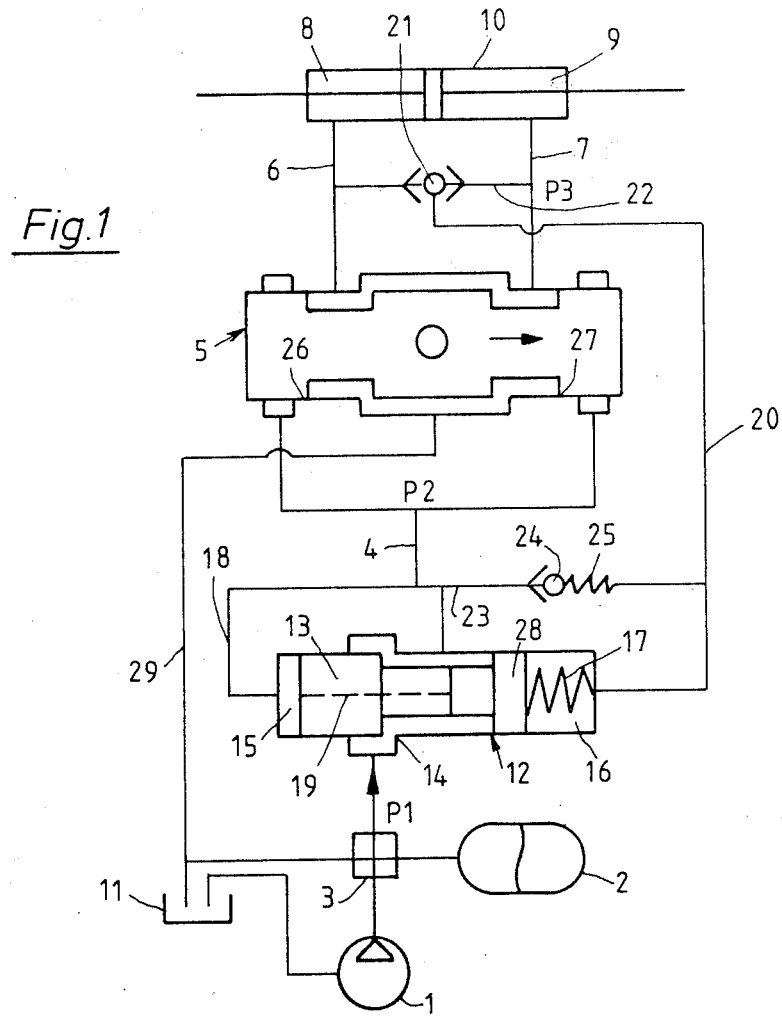
FIG. 1 is a fluid circuit diagram depicting an auxiliary power steering system in accordance with one embodiment of the invention.

Referring now to the drawing in detail, FIG. 1 illustrates a fluid circuit representing an auxiliary power steering system, in accordance with the present invention. A pressurized fluid source includes a servo pump 1 constituting a pressure generator and a pressure storing reservoir 2 associated therewith through a loading valve 3. A steering control valve generally referred to by reference numeral 5 is supplied with pressurized fluid through a supply conduit 4 from the pressure source. The steering control valve is operated in a manner well known in the art by a hand steering wheel (not shown). While the steering control valve shown is of the flow passage controlling type, a fluid power controlled type is also contemplated within the scope of the invention. The steering control valve is connected through operating pressure lines 6 and 7 to the operating chambers 8 and 9 of a servomotor cylinder 10. A fluid return tank 11 is also provided. The foregoing components of the fluid circuit are essential to the type of auxiliary power steering system, with which the present invention is associated, in accordance with the present state of the art.

A pressure reducing valve generally referred to by reference numeral 12 including an axially shiftable control valve piston 13, is operatively connected between the fluid pressure storage reservoir 2 and the steering control valve 5. A fluid inlet, valve control edge 14 is formed between the control piston 13 and the housing of valve 12. A pressure balancing chamber 15 is disposed at one axial end of the control piston 13 in opposing relation to a spring chamber 16 enclosing a spring 17. The pressure balancing chamber 15 is in fluid communication by means of bore 19 (shown in dotted line) with an annular valve space in the valve housing to which fluid is supplied under control of the valve edge portion 14. The spring chamber 16 is connected by a pressure feedback conduit 20 to the servomotor pressure lines 6 and 7 through a flow switching valve 21 in a transverse connecting line 22.

Flow of pressurized fluid to the steering control valve 5 through supply conduit 4 may be short-circuited through line 23 to conduit 20 by opening of a relief valve 24, biased to a closed position by a prestressed valve closing spring 25.

The pressure reducing valve 12 is operative to reduce a high operating pressure $P_1$ (140–180 BAR) of the fluid conducted thereto from reservoir 2 to a considerably lower regulated pressure $P_2$ in supply conduit 4 to the steering control valve 5. The pressure of the fluid is further reduced by the steering control valve 5 to a low operating pressure $P_3$ conducted to the operating chambers 8 and 9 of the servomotor 10 by lines 6 and 7. In the neutral position of the steering control valve 5, inlet control valve edges at 26 and 27 block flow. The force exerted by the pressure in chamber 15 on the control piston 13 is in equilibrium with the opposing bias of spring 17. Accordingly, the only balancing action in valve 12 occurs in response to leakage of fluid. The regulated pressure $P_2$ at the valve edge portions 26 and 27 of valve 5 is therefore dictated by the force of spring 17. Such conditions generally prevail when the power of spring 17 produces, for example, a pressure of 10 BAR acting on the piston surface at axial end 28 of the control valve piston 13.

The relief valve 24 is operative to smooth out pressure reduction in the feed line 4. In the neutral position of valve 5, operating pressure $P_1$ is momentarily applied to the valve edge portions 26 and 27 through supply line 4 so that a high pressure is at the same time applied through line 18 to the pressure balancing chamber 15 shifting the control piston 13 in a right hand direction as viewed in FIG. 1 to a flow blocking position. The high momentary pressure in supply line 4 also opens check valve 24 against the closing bias of spring 25 which is somewhat greater than that of spring 17 in pressure reducing valve 12. The high operating pressure fluid therefore flows through check valve 24, feedback line 20, pressure line 6 or 7, the return flow valve edges of control valve 5, and return line 29 to the tank 11. The pressure in supply line 4 therefore drops and the check valve 24 closes so that the lower pressure $P_2$ may then prevail in line 4.

In response to operation of the control valve 5 causing displacement thereof in the right hand direction of the arrow shown in FIG. 1, for example, the regulated pressure $P_2$ in supply line 4 decreases, resulting in spring 17 of valve 12 displacing the control piston 13 in a left hand direction. The flow passage at valve edge portion 14 is thereby enlarged so as to increase the feed pressure $P_2$ as well as the operating pressure $P_3$ corresponding thereto. Also, the flow switching valve 21 is moved from the neutral position shown in a left hand direction so that the operating pressure $P_3$ in line 7 then prevails in feedback line 20 and operating chamber 9. Thus, the same operating pressure $P_3$ in servomotor chamber 9 will prevail in spring chamber 16 to oppose the higher feed pressure $P_2$ in balancing chamber 15. The resulting pressure conditions are expressed as:

$$(P_2)(A) = (P_3)(A) + F \qquad (1)$$

where A is the piston surface areas the opposite end portions of control piston 13 and F is the spring force of spring 17. Transposing the foregoing equation results in:

$$P_2 = P_3 + F/A. \quad (2)$$

The pressure differential at valve edge portions 26 and 27 of steering valve 5 may be expressed as:

$$\Delta P = P_2 - P_3 \quad (3)$$

Therefore, from substituting from equation (2)

$$\Delta P = P_3 + F/A - P_3 = F/A \text{ (constant)}$$

It will be apparent from the foregoing that the differential pressure $\Delta P$ at the inlet valve edge portions 26 and 27 is always constant and independent of the total pressure. For this reason, the same quantity of fluid will always be conducted to the operating chambers 8 and 9 of the servomotor 10. Only the spring force F of spring 17 and the piston surface area A will determine the differential pressure $\Delta P$.

Figure 2:
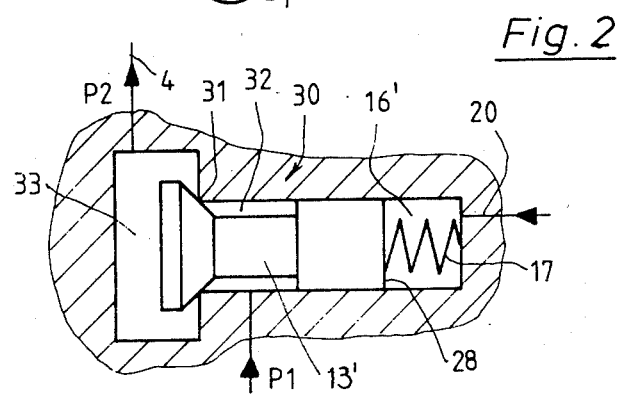
FIG. 2 is a somewhat simplified section view of a pressure reducing valve of a different type from that illustrated in FIG. 1.

Pressure reducing valves other than the one specifically described with respect to FIG. 1, may be utilized within the scope of the present invention as long as a corresponding pressure balancing action is achieved. FIG. 2 shows an alternative pressure reducing valve 30 by way of example, wherein a valve seat 31 engaged by a control valve piston 13' replaces the flow controlling edge portion 14 of valve 12 in FIG. 1. The inlet to valve 30 conducts fluid into an annular valve space 32 while the outlet discharges into supply line 4 leading to the control valve 5 from a valve space 33 on the downstream side of the valve seat 31. The pressure controlling line 18 and control piston bore 19 as shown in FIG. 1, are eliminated since the feed pressure $P_2$ acts directly on a pressure face of control valve piston 13' against the bias of spring 17 in chamber 16' acting on the surface of piston end portion 28'.

The pressure reducing valve may be physically incorporated either into the steering gear assembly or into the charge valve for the reservoir 2 depending on various installational factors. The advantage of the resulting structural compactness is to avoid exposure of a pressure reducing valve supply line to a constant high operating pressure in the pressure storage reservoir 2. On the other hand, the foregoing compact arrangement may require longer connecting control lines.

What is claimed is:

1. In an auxiliary power steering system for motor vehicles having a pump (1), a pressure storage reservoir (2) charged with fluid by the pump, a manually operable steering control valve (5) that is closed in neutral position thereof, at least one piston servomotor (10) provided with two pressure spaces (8, 9) to which fluid is conducted under an operating pressure from the control valve, and a return tank (11) connected to one of the pressure spaces by the control valve when displaced from said neutral position, the improvement residing in pressure reducing valve means (12, 30) operatively connected between the pressure storage reservoir and the steering control valve for supplying fluid under a regulated pressure to the steering control valve, said pressure reducing valve means having opposed sides, a spring (17) acting on one of said sides (28) to exert a bias thereon, feedback means having at least one connecting line (20) extending from the pressure spaces of the servomotor for augmenting the bias of the spring with fluid under said operating pressure, and pressure balancing means for supplying the fluid under said regulated pressure to the other of said sides of the pressure reducing valve means to act thereon in opposition to the spring.

2. The improvement as defined in claim 1, wherein the pressure reducing valve means includes a housing enclosing pressure chambers (15, 16) respectively at said opposed sides, a supply line (4) conducting fluid under said regulated pressure from the housing to the steering control valve, a floatingly mounted regulating valve piston (13) shiftable in an axial direction within the housing and having an inlet control edge (14) cooperating with the housing to regulate the pressure of the fluid, one of said pressure chambers (16) enclosing the spring and being connected by the connecting line to the pressure spaces of the servomotor, the other of the pressure chambers (15) being connected to the supply line.

3. The improvement as defined in claim 1, wherein the pressure reducing valve means includes a housing within which a valve seat (31) is mounted, a valve piston (13') movably mounted within the housing and engageable with the valve seat at one of said sides to regulate the pressure of the fluid, said valve piston forming an annular valve space (32) within the housing through which fluid is conducted, a pressure chamber (33) downstream of the annular valve space through which flow of the fluid is conducted to the steering control valve, a second pressure chamber (16') enclosing the spring, and feedback connecting means (20) conducting fluid under pressure from the pressure spaces of the servomotor to the second pressure chamber.

4. The improvement as defined in claim 2, including relief valve means (24) connected between the supply line and the feedback connecting means (20) for short circuiting the pressure reducing valve means, said relief valve means having a valve closing spring (25) exerting a bias that is greater than that of the spring (17) associated with the pressure reducing valve means.

5. The improvement as defined in claim 1, including two operating pressure lines (6 and 7) connecting the steering control valve to the pressure spaces of the servomotor, a transverse connection (22) between said operating pressure lines and switching valve means (21) interconnecting said transverse connection and the feedback connecting line (20) for conducting fluid under the operating pressure of the servomotor to the pressure reducing valve means.

6. In an auxiliary power steering system having a source of fluid under a high operating pressure (1-2), a pair of servo operating chambers (8, 9), a steering control valve; (5) conducting said fluid to the operating chambers under a low operating pressure, and pressure reducing valve means (12, 30) operatively connecting the source to the steering control valve for reducing the high operating pressure of the fluid supplied to the steering control valve to a regulated pressure higher than the low operating pressure, the improvement residing in valve control means (15, 16, 17) connected to the pressure reducing valve means for maintaining a constant pressure differential between the regulated and low operating pressures to establish a constant flow of said fluid to the servo operating chambers.

7. The improvement as defined in claim 6, wherein said pressure reducing valve means includes a differential pressure actuated control valve element (13, 13'), and said pressure balancing means includes feedback pressure means (15, 16) for exerting opposed displacing forces on the control valve element as functions of said regulated and low operating pressures, respectively, and spring means (17) for augmenting the displacing force exerted as a function of the low operating pressure to determine the magnitude of said constant pressure differential.

8. The improvement as defined in claim 7, including relief valve means (24) connected in short circuit relation to the pressure reducing valve means for promptly lowering momentary high pressure of the fluid supplied to the steering control valve before regulation thereof by the pressure reducing valve means.

9. The improvement as defined in claim 6, including check valve means (24) connected in short circuit relation to the steering control valve independently of the pressure reducing valve means for promptly lowering momentary high pressure of the fluid supplied to the steering control valve before regulation thereof by the pressure reducing valve means.

* * * * *